Jan. 11, 1938. H. A. DOUGLAS Re. 20,618

ELECTRICAL ADAPTER MEANS

Original Filed Oct. 14, 1932

Harry A. Douglas
INVENTOR
By Freeman, Sweet, Albrecht, and Weidman
ATTORNEYS

Reissued Jan. 11, 1938 Re. 20,618

UNITED STATES PATENT OFFICE 20,618

ELECTRICAL ADAPTER MEANS

Harry A. Douglas, Bronson, Mich., assignor to Kingston Products Corporation, a corporation of Indiana Original No. 1,956,380, dated April 24, 1934, Serial No. 637,717, October 14, 1932. Application for reissue August 15, 1935, Serial No. 36,322

12 Claims. (Cl. 173—269)

This invention relates to electrical adapter means more particularly for snap terminal connectors.

Among other objects, the invention aims to provide a separable terminal and receptacle therefor which may be interchangeably engaged each with one of a pair of complementary electrical conductors to provide a quickly made and secure snap terminal connection therebetween.

The invention is of particular utility for use in conjunction with internal-combustion engine spark plugs and the high voltage leads thereto.

Other objects and advantages will be readily apparent from the following description taken together with the accompanying drawing, in which—

Figure 1:
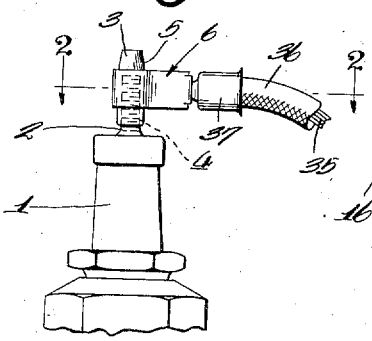
Figure 1 is an elevational view of a portion of a spark plug and lead with my invention applied thereto.
Figure 2:
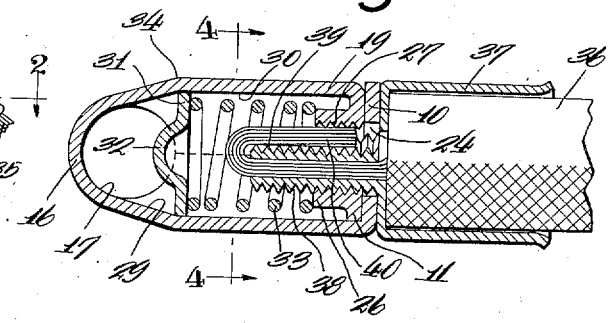
Figure 2 is a longitudinal sectional view on a larger scale taken on the line 2—2 of Figure 1, parts being shown in elevation and with the spark plug terminal omitted.

Referring in detail to Figures 1 and 2 of the drawing, I have shown a conventional spark plug 1 provided with the usual exteriorly threaded metallic conductor tip 2 which carries the current to the central electrode of the plug in a well known manner.

In accordance with one form of my invention the usual nut which is screwed on the tip 2 may be discarded and a separable metallic terminal 3 screwed thereon, said terminal having an interiorly screw-threaded socket 4 which receives the tip 2. The terminal 3 is generally cylindrical but desirably has a frustro-conical nose 5. Engaged with the terminal 3 by having the terminal 3 received therein, is a receptacle 6 which is desirably of sheet metal and preferably formed as next described.

Figure 3:
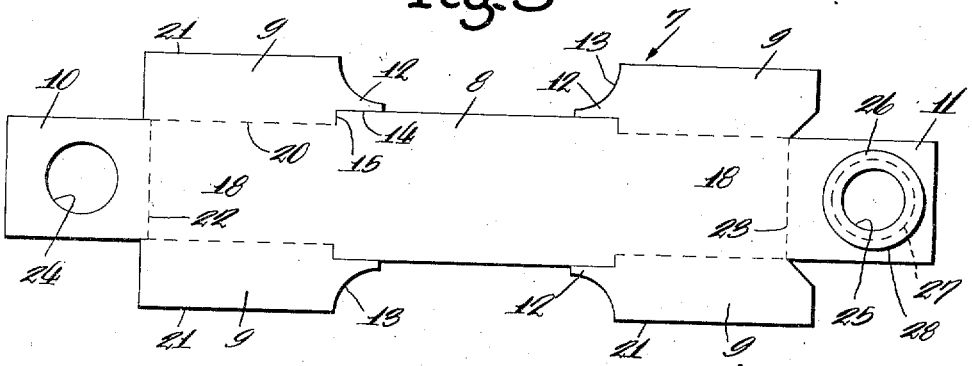
Figure 3 is a development view of the receptacle of my improved adapter illustrating its preferred formation.
Figure 6:
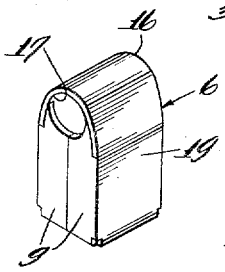
Figure 6 is a perspective view of the preferred sheet metal receptacle.

As shown in Figure 3, the receptacle 6 may be struck out from a single piece of sheet metal, such as brass, to the shape of the blank 7 having a rectangular central portion 8, wing portions 9 at each corner of the rectangular portion and end continuations 10 and 11 extending beyond the wing portions 9. The wing portions 9 are shown provided with oppositely directed ears 12 having arcuate edges 13, each of the ears 13 being severed from the central portion 8 as at 14 and 15. The blank 7 is next folded in a return bend midway of the central portion 8 to cause the bight 16 of the blank (see Figure 2) to form a semicylindrical wall for the terminal receiving portion 17 for the receptacle 6, the portions 18 of the central rectangular portion 8 of the blank forming two of the walls of a socket portion 19 of the receptacle 6. Each of the wing portions 9 is bent laterally from the portions 18 at the dotted lines 20 to have their adjacent edges 21 abut to form the other two sides of the socket portion 19. At the same time the ears 12 of the wing portions 9 are disposed in the terminal receiving portion 17 of the receptacle and the arcuate edges 13 of these ears cooperate with each other and with the bight 16 to define a cylindrical aperture in the terminal receiving portion, as best shown in Figure 6, this cylindrical aperture receiving the generally cylindrical terminal 3 as previously stated. The end continuations 10 and 11 of the blank 7 are bent on the dotted lines 22 and 23 to overlap transversely of the socket portion 19 and form a bottom therefor, as best shown in Figure 2. The end continuations 10 and 11 are shown circularly perforated as at 24 and 25, respectively, and one of the continuations, in this instance, the continuation 11, which is the inner of the two, has the margins of its perforation continued inwardly of the socket portion 19 to provide a conductor receiving sleeve 26 which is interiorly screw-threaded as at 27, the sleeve 26 being formed by drawing the margins 28 of the perforation 25 in a manner well-known to those skilled in the art. So constructed and arranged, the hollow interiors 29 and 30 of the terminal receiving portion 17 and socket portion 19, respectively, are transversely related and intersect. A plate 31, in this instance square, having a dome-shaped boss 32 thereon provides a detent which is housed by the socket portion 19 and projected into the terminal portion 17 by the pressure of a coil spring 33 also housed in the socket portion 19 between the detent and the sleeve 26. The contraction of the receptacle as at 34 where the walls of the terminal receiving portion 17 merge into the socket portion 19 limits movement of the detent 31 into the terminal receiving portion 17.

As here shown the wire 35 heavily insulated as at 36 constitutes a high voltage lead to the spark plug 1 and this wire 35 may have secured thereto a metallic sleeve 37 which has an integral exteriorly screw-threaded conductor tip 38, the sleeve 37 being enlarged to receive the insulation 36 and the tip 38 being mechanically and electrically secured to the wire 35 in a manner shown and claimed in my Patent No. 1,339,694 of May 11, 1920, the tip 38 being longitudinally collapsed at one point along its periphery as at 39 and the extremities 40 of the strands of the wire 35 being bent back to lie in the longitudinal groove thus formed in the tip. When the receptacle is screwed onto the tip 38, as shown in Figures 1 and 2, the tip 38 is threadedly received in the socket portion 19 of the receptacle and extends up into the hollow interior 30 thereof to be encircled by the coil spring 33.

Figure 5:
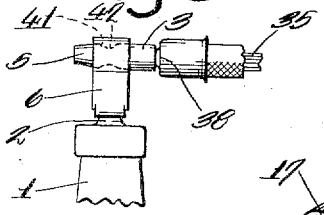
Figure 5 is a view similar to Figure 1 but with the receptacle and terminal reversed.
Figure 4:
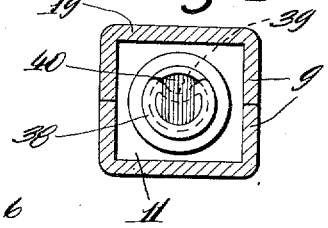
Figure 4 is a cross-section taken on the line 4—4 of Figure 2.

Since in accordance with my invention the terminal 3 and the receptacle 6 are selectively interchangeable, the receptacle 6 may be screwed onto the conductor 2 of the spark plug 1 as shown in Figure 5 and the terminal 3 may be screwed onto the conductor tip 38 of the wire 35, without any change in the parts and to suit the convenience of the user. In either case the terminal 3 is received in the socket portion 17 of the receptacle 6 as already described and yieldingly retained therein by the spring pressed detent 31. The terminal 3 is desirably formed not only with the frustro-conical portion 5 but with another frustro-conical portion 41 which is disposed base to base with the frustro-conical portion 5. An annular peripheral groove 42 is located on the terminal 3 between the frustro-conical portions 5 and 41 and the main cylindrical portion of the terminal. The dome-shaped boss 32 of the detent 31 rides over the tapered surfaces of the frustro-conical portions 5 and 41 and snaps into the groove 42, thus forming a secure snap connection which may be easily made or broken by appropriate pressure or pull, as the case may be, upon the terminal 3 into or out of the receptacle 6.

It is well-known that snap terminals are far superior to nut and screw terminals and by the use of my invention a spark plug, for example, may be readily adapted for a snap terminal connection without change in the structure of the plug and the plugs now in use may be readily thus equipped.

Obviously, the invention is not limited to the details of construction here shown for purposes of exemplification. Furthermore, it is not essential that all of the elements of the invention be used conjointly, since various combinations and subcombinations may be advantageously employed.

I claim:

1. Electrical adapter means comprising a receptacle formed of sheet metal having a rectangular central portion, a wing portion integral therewith at each four corners of the central portion, and substantially square end continuations of the central portion extending beyond the wing portions, with said central portion folded in a return bend to have its bight form a semi-cylindrical terminal receiving portion and two of the walls of a socket portion and said wing portions laterally bent from said central portion to have adjacent edges of each pair of two wing portions abut to form the other two sides of the socket portion, and said end continuations overlapped transversely of the socket portion to form a bottom therefor, said wing portions having oppositely disposed ears provided with arcuate edges, said ears being disposed in the terminal receiving portion and cooperating with each other and with the bight of the central portion to define a cylindrical aperture in the terminal receiving portion and said end continuations circularly perforated with the margins of the perforation upon the inner end continued inwardly of the socket portion and interiorly screw-threaded to provide a conductor receiving sleeve.

2. The structure of claim 1 wherein a detent is housed within the socket portion projecting into the terminal receiving portion with a coil spring mounted within the socket portion resting upon the bottom thereof and pressing against said detent.

3. Electrical connection means comprising a receptacle formed of sheet metal having a rectangular central portion, a wing portion integral therewith at each four corners of the central portion, and end continuations of the central portion extending beyond the wing portions, with said central portion folded in a return bend to have its bight form a part of a terminal receiving portion and two of the walls of a socket portion and said wing portions laterally bent from said central portion to have adjacent edges of each pair of two wing portions disposed to form the other two sides of the socket portion, and said end continuations overlapped transversely of the socket portion to form a bottom therefor, said wing portions having ears arranged with respect to each other and with respect to the bight of the central portion to define the remainder of the terminal receiving portion, and said end continuations circularly perforated with the perforation of the inner end continuation interiorly screw-threaded to receive a conductor.

4. Electrical connection means comprising a receptacle formed of sheet metal having an elongated central portion, a wing portion integral therewith at each four corners of the central portion, and end continuations of the central portion extending beyond the wing portions, with said central portion folded in a return bend to have its bight form a part of a terminal receiving portion and two of the walls of a socket portion and said wing portions laterally bent from said central portion to have adjacent edges of each pair of two wing portions disposed to form the other two sides of the socket portion, and said end continuations overlapped transversely of the socket portion to form a bottom therefor, said wing portions having oppositely disposed ears provided with arcuate edges, said ears cooperating with each other and with the bight of the central portion to define the remainder of the terminal receiving portion, and means providing a threaded connection constructed and arranged to connect together said end continuations.

5. Electrical connection means comprising a receptacle formed of sheet metal having an elongated central portion, a wing portion integral therewith at each four corners of the central portion, and end continuations of the central portion extending laterally of the wing portions with the central portion folded in a return bend to have its bight form a part of a terminal receiving portion and two of the walls of a socket portion and said wing portions laterally bent from said central portion to have adjacent edges of each pair of two wing portions disposed to form the other two sides of the socket portion, and said end continuations overlapped transversely of the socket portion to form a bottom therefor, said wing portions having ears arranged with respect to each other and with the bight of the central portion to define the remainder of the terminal receiving portion, one of said end continuations being provided with an opening and the other with a threaded tubular extension, a spring and a detent arranged in said socket portion with one end of the spring engaging the inner extremity of said tubular extension, and the other end engaging and urging said detent to normally intersect the terminal receiving aperture, and threaded means cooperating with said threaded tubular extension constructed and arranged to clamp said overlapping end portions together.

6. Electrical connection means comprising a receptacle formed of sheet metal having a rectangular central portion, a wing portion integral therewith at each four corners of the central portion, and substantially square end continuations of the central portion extending beyond the wing portions, with said central portion folded in a return bend to have its bight form a semicylindrical terminal receiving portion and two of the walls of a socket portion and said wing portions laterally bent from said central portion to have adjacent edges of each pair of two wing portions abut to form the other two sides of the socket portion, and said end continuations overlapped transversely of the socket portion to form a bottom therefor, said wing portions having oppositely disposed ears provided with arcuate edges, said ears being disposed in the terminal receiving portion and cooperating with each other and with the bight of the central portion to define a cylindrical aperture in the terminal receiving portion, said end continuations circularly perforated with the margins of the perforation upon the inner end continued inwardly of the socket portion and interiorly screw-threaded to provide a conductor receiving sleeve, and a threaded element cooperating with said sleeve whereby to clamp one of said end continuations between the other end continuation and said threaded element.

7. Electrical connection means comprising a receptacle formed of sheet metal having an elongated central portion with enlarged end extremities, said central portion and said extremities being folded whereby the central portion and said end extremities form a terminal receiving aperture and a shell, a spring pressed detent arranged in said shell with the detent intersecting said aperture, end portions formed on said extremities and bent to overlap each other, and means for securing said end portions together.

8. Electrical connection means comprising a receptacle formed of sheet metal having an elongated central portion with enlarged end extremities, said central portion and said extremities being folded whereby the central portion and said end extremities form a terminal receiving aperture and a shell, a spring pressed detent arranged in said shell with the detent intersecting said aperture, end portions formed on said extremities and bent to overlap each other, one of said end portions being threaded and the other being provided with an aperture, a threaded element extending through said aperture and cooperating with the threads on said first mentioned end portion to clamp said end portions together.

9. Electrical connection means comprising a receptacle formed of sheet metal having an elongated central portion with enlarged generally rectangular end extremities, said central portion and said extremities being folded whereby to form a terminal receiving aperture and a shell, overlapping end continuations formed on said extremities, one of said end continuations being provided with an aperture and the other with a threaded tubular extension, a detent and a spring arranged in said shell with the detent intersecting the terminal receiving aperture and with one end of the spring engaging the detent and the other end of said tubular extension, and means cooperating with the threaded extension for clamping the overlapping end continuations together.

10. Electrical connection means comprising a receptacle formed of sheet metal having a central portion with enlarged end extremities, said central portion and said extremities being folded whereby to form a terminal receiving aperture and a shell, a spring pressed detent arranged in said shell with the detent intersecting said aperture, end portions formed on said extremities and bent to transversely overlap each other, an opening provided in each of said end portions through which means may be inserted constructed and arranged to secure the overlapped end portions together.

11. Electrical connection means comprising a receptacle formed of sheet metal having a central rectangular portion with enlarged end extremities, said central portion and said extremities being folded whereby to form a cylindrical terminal receiving aperture and a shell, a spring pressed detent arranged in said shell with the detent intersecting said aperture, end portions formed on said extremities and bent to transversely overlap each other, one of said end portions being provided with a tubular extension having connecting means, the other of said end portions being provided with an aperture through which means may be extended to cooperate with said connecting means to secure the overlapping end portions together.

12. Electrical connection means comprising a receptacle formed of sheet metal having an elongated central portion with enlarged end extremities, said central portion and said extremities being folded whereby to form a terminal receiving aperture and a shell, a spring pressed detent arranged in said shell with the detent intersecting said aperture, end portions provided with openings and formed on said extremities and bent to transversely overlap each other in a manner to maintain the regularity of the cross-sectional outline of said shell and to register said openings, and means adapted to extend through said openings constructed and arranged to connect said overlapping end portions together.

HARRY A. DOUGLAS.